Oct. 29, 1940.　　R. L. STEVENS ET AL　　2,219,497
ELECTROSTATIC TYPE TEST ELECTRODE
Filed Jan. 11, 1938　　2 Sheets-Sheet 1

Inventors.
Robert L. Stevens.
James P. Dallas.
Attorney.

Oct. 29, 1940.　　　R. L. STEVENS ET AL　　　2,219,497
ELECTROSTATIC TYPE TEST ELECTRODE
Filed Jan. 11, 1938　　2 Sheets-Sheet 2
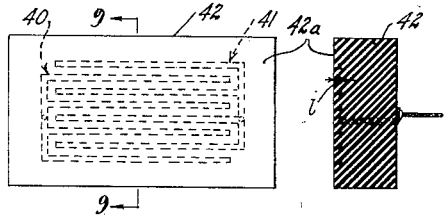
*Fig. 8.*　　*Fig. 9.*
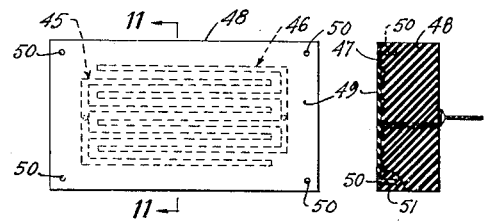
*Fig. 10.*　　*Fig. 11.*
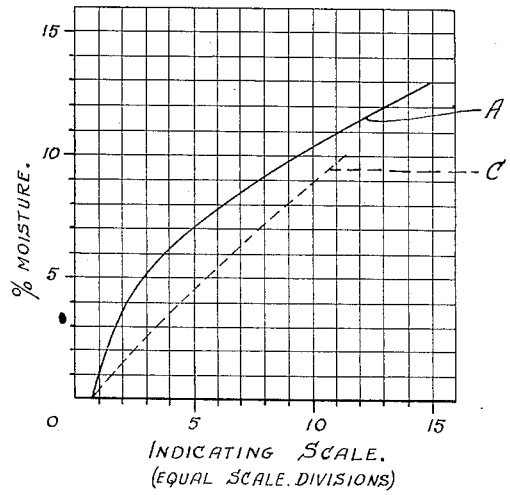
*Fig. 12.*
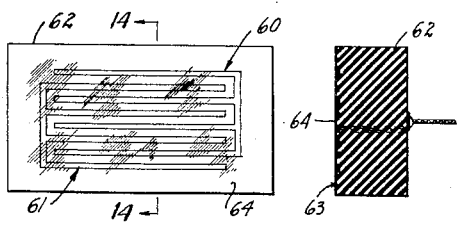
*Fig. 13.*　　*Fig. 14.*
Inventors.
Robert L. Stevens.
James P. Dallas.
*Attorney.*

Patented Oct. 29, 1940

2,219,497

UNITED STATES PATENT OFFICE 2,219,497

ELECTROSTATIC TYPE TEST ELECTRODE

Robert L. Stevens and James P. Dallas, Seattle, Wash., assignors of one-half to Dillon Stevens and one-half to M. B. Pendleton, both of Los Angeles, Calif.

Application January 11, 1938, Serial No. 184,420

5 Claims. (Cl. 175—183)

This invention relates generally to electrostatic type electrodes for applying high frequency electrostatic fields to substances in various types of operations. Such electrodes are used, for instance, in test or control apparatus, as apparatus sensitive to such a property of materials as moisture content.

For an understanding of certain typical uses to which electrodes of the type of which the present invention is concerned may be applied, reference may be directed to our copending application entitled Apparatus and method for electrically testing materials, Ser. No. 15,633, filed April 10, 1935, now Patent No. 2,123,812, and our later copending application entitled Power absorption metering system, Ser. No. 125,110, filed February 10, 1937. A typical though not an exclusive use of such equipment is the measurement of, or response in accordance with, percentage of moisture content in a given material. The method consists in subjecting the material in question to the influence of the electrostatic field of a test electrode unit, thereby causing a change in the electrical state of the electrical system which energizes the electrodes, which change may for instance be read on an indicating instrument, or utilized to effect a control operation, etc. In accordance with our preferred test and control equipment, disclosed in the aforesaid application, Ser. No. 125,110, the system operates or reads in terms of the power absorbed from the electrostatic field of the electrodes by the material placed in said field. It may be stated, however, that while the electrodes may be operated in conjunction with test or control equipment on a power absorption principle, no limitation on the scope of the present invention is to be implied therein, since the electrostatic electrodes of the present invention are adapted for use in various other types of tests and/or control systems, or in such applications as heating, etc.

The electrode unit is of a type comprising two co-planar electrodes of the condenser plate or electrostatic field type. The physical advantage in placement of both electrodes in one common plane (which per se is not new) resides in the fact that the electrostatic field between a pair of electrodes so arranged extends beyond the face of the electrode unit, and may be caused to penetrate the surface of a wall or given sample of material by simply applying the electrode unit to the face of the wall or material in question. This permits applying a field to a material, as for example to a concrete wall, in situations in which placement of test electrodes on opposite sides of the material might be impossible.

Among the objects of the present invention are:

To provide an electrostatic type electrode unit characterized by uniformity of field concentration over a given area, and also uniformity of depth of penetration of the material by the field applied thereto;

To provide an electrode unit having a uniform field of relatively small effective depth, such that the field will not project through and beyond thin materials as paper pulp or veneers when the unit is applied thereagainst, the advantage in such a condition being that the thickness of the material does not affect the reading of a connected indicating instrument provided that the effective field depth is less than the thickness of the material on test;

To provide an electrostatic type electrode capable of being designed to have various degrees of field concentration with relation to effective depth of field;

To provide a test electrode unit for such uses as moisture registration which tends to give a reading of average moisture content rather than a peak reading when applied to a material in which the property under test is non-uniform or "spotty;"

To provide a test electrode unit of such characteristics that the effect of surface irregularities of a material under test is minimized;

To provide means at the electrostatic test electrodes for controlling the response characteristic of test apparatus such as moisture register apparatus; and To provide an electrostatic electrode device adapted for measurement of, or response in accordance with, relative humidity.

The electrode unit provided by the present invention is comprised, in general, of relatively long and narrow co-planar plate elements of relatively narrow uniform spacing, and usually of small thickness dimension. Usually and preferably, though not in all instances, each electrode is formed with a plurality of branching plate elements, the branches of one electrode interfitting at uniform spacing with the branches of the opposite electrode, so that the electrode unit covers over a given area of the material to which the electrostatic field is to be applied.

We have discovered that the effective penetration of a material by the electrostatic field of a pair of coplanar electrode plates or elements of uniform widths and spacings, as provided by the present invention, is directly proportional to the width of the gap or spacing between the plates and inversely proportional to the width dimension of the plates, and also that the amount of power absorbed, or the "sensitivity" of the device, is proportional to the total length of the gap between electrode plates, and also to electrode plate width when the latter dimension is less than the width of the gap. Furthermore, when the electrode plates are made relatively narrow, and are branched or otherwise arranged to cover a substantial area of the material, the amount of power absorbed by spots in the material of high power absorbing qualities is relatively small as compared with the total power drawn from the electrode set by the balance of the material area under test, and the effect is therefore to minimize the tendency toward a "peak" response when a small spot of high power absorbing characteristics is encountered. The response or effect on the connected apparatus thus becomes closely proportional to the average power absorbing quality of the material rather than rising to peak values under the influence of relatively small local areas of high power absorbing characteristics. This is of particular importance in moisture testing of paper pulp, where the condition described has heretofore constituted a serious problem. Accordingly, to secure uniformity of field, high sensitivity of response, and avoidance of a tendency to "peak" responses, the electrode plate members and are made of uniform widths and of uniform spacing, with the width dimension of the plates of the order of their spacing dimension (in instances, wherein high sensitivity is required, being slightly smaller in width than the width of the gap between plates), and with the gap comparatively long.

We have found that to establish uniformity and depth of electrostatic field from a set of coplanar electrodes, the ratio of the capacity between the surfaces of the plates and the capacity between the edges of the plates should be as large as possible, since "edge capacity" has the effect of an undesirable capacitative shunt. In accordance with the present invention, this end is preferably accomplished by use of electrode plates of extreme thinness, e. g., of foil dimensions. In order to secure a long gap (high sensitivity), and also to cover a substantial area of the material under test with narrow plate members, without unduly increasing the electrical resistance of the plate members, the two electrodes are, in most applications, branched and interfitted at the required electrode spacing distance.

As stated in the preceding paragraph, in certain forms of the present invention, the metallic electrode members are exceptionally thin, and may be as thin as is consistent with necessary electrical conductivity, in order to keep the ratio of surface capacity to edge capacity as high as possible. This leads to members of foil-like thinness. Methods of producing such electrodes are disclosed and claimed in our copending application entitled Method of making high frequency test electrodes, Ser. No. 184,419, filed Jan. 11, 1938. Such electrode elements, typically of from one to several thousandths of an inch in thickness, are relatively delicate, and it is a further object of the present invention to provide means for protecting such electrode elements.

An important feature forming a part of the present invention thus comprises a cover plate of non-power absorbing characteristics placed over the surface of the electrode plates or elements. This cover plate serves as a mechanical protection to the thin electrode plates, but has also certain beneficial effects with respect to the response characteristics of the device. The field densities of an electrode unit with all its plate elements in one plane are extreme near the surface of the elements, not following a strictly inverse square law with relation to the distance from the surface of the elements. This condition is due to the curvature of the field, which arches from one electrode element to the other and is highly concentrated between the edges of adjacent elements. The cover plate used over the electrode elements spaces the material to be tested from the surface of the electrode, and from the highly concentrated portions of the field, so that the material is penetrated only by the more uniform field existing beyond the outer plane of the cover plate. It will be evident that small surface irregularities, particularly in the material being tested, will therefore have a lessened effect on the test apparatus connected to the electrode unit.

Use of a cover plate over the electrode elements, or of other means for spacing the electrode elements from the material on test, also has the effect of straightening the response characteristic curve of the unit. A further feature of the present invention is the provision of a series of interchangeable electrode cover plates or spacing stops of varying thicknesses, enabling the response characteristics to be varied, or providing a multiple range instrument.

Another variational form of the present invention is an electrode unit designed for measurement of relative humidity. In this form of the invention, the electrode elements are covered over with a layer of hygroscopic material adapted to absorb moisture from the air in a known relation to the relative humidity of the air. The electrode unit and connected measurement apparatus measures the power absorption characteristics of this layer, which of course varies according to the same relation with the relative humidity of the atmosphere. By this means, the relative humidity of the atmosphere, or of any gaseous medium in which the electrode unit is placed, may be directly read.

There are various other features, aspects and accomplishments of the invention, which will appear in the course of the specification, and with the preliminary discussion now given in mind, reference will here be directed to the accompanying drawings, in which:

Fig. 8 is an elevation of a covered type of test electrode;

Fig. 9 is a section on line 9—9 of Fig. 8;
Fig. 10 is an elevation of a modified form of covered electrode;
Fig. 11 is a section on line 11—11 of Fig. 10;
Fig. 12 is a graph showing the relation between percentage of moisture and scale divisions on a connected indicating apparatus;
Fig. 13 is an elevation of an electrode device for hygroscopic measurement; and
Fig. 14 is a section on line 14—14 of Fig. 13.

Figures 1, 2:
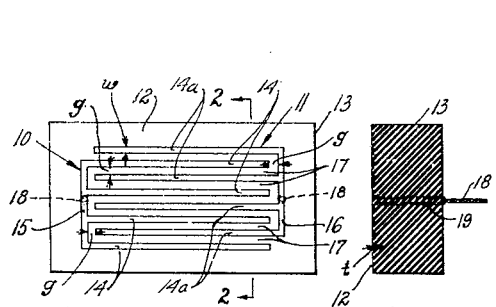
Fig. 1 shows an electrode unit in accordance with one form of the present invention.
Fig. 2 is a cross section on line 2—2 of Fig. 1.

Figs. 1 and 2 show one simple form of the invention. The two co-planar condenser type electrode plate elements 10 and 11 are shown as mounted on or embedded in the plane face 12 of an insulation base block 13. For instance, base block 13 may be a molded plastic, into the face of which the electrode members are embedded under pressure while the plastic is in a heated condition. There is thus provided an electrode device in which the faces of the electrode members are flush with the face of the insulation base, as clearly indicated in Fig. 2.

In the form of the invention depicted in Figs. 1 and 2, electrode members 10 and 11 comprise parallel, uniform-width plate members or elements 14 and 14a, respectively, the plate members 14 of electrode 10 being interconnected at one end by a connecting plate member 15, arranged at right angles to members 14, and the plate members 14a of electrode 11 being connected at the opposite end by a connecting plate member 16 disposed at right angles to members 14a. Members 14a of electrode 11 are spaced at uniform spacing distances $g$ between members 14 of electrode 10, in the manner clearly indicated, while electrode members 14, 14a, 15 and 16 are all of the same width dimension $w$. The terminal ends of members 14 and 14a terminate short of electrode members 16 and 15, respectively, by distances equal to gap width $g$, as indicated. It will be evident that the two electrode members 10 and 11, the elements 14, 14a, 15 and 16 of which are everywhere of the same width dimension $w$, form between them a long, narrow gap 17 of constant width $g$. In the present instance, the electrode plate elements are of a thickness dimension $t$ of approximately .008″, while plate width dimension $w$ is $\frac{1}{16}$″ and gap width $g$ is $\frac{3}{32}$″. Thus in the example given, the width $w$ of the plates is slightly less than gap width $g$, though the two dimensions are of the same order.

Each of electrodes 10 and 11 has connected thereto a lead 18 extending rearwardly through a drill hole 19 in insulation block 13. It will be understood that leads 18 will be energized by the high frequency current output of such a register system, for instance, as disclosed in our aforementioned copending application Serial No. 125,110. The resulting electrostatic field between plate members 14 and 14a is indicated at F in Fig. 2a, and it will be understood that this field arches between plate members 14 and 14a to establish an electrostatic field extending substantially uniformly from the substantially rectangular area covered by the two electrode members. It will be understood that surface 12 of the electrode unit is placed adjacent the material to be tested, heated, etc., as the case may be, so that electrostatic field F penetrates said material, thereby effecting an absorption of power by the material from the electrostatic field, together with certain other phenomenon including alteration of the dielectric constant in which the electrostatic field exists, a phase shift, etc., any one or all of which responses may be measured by or utilized in the apparatus connected to the electrode unit.

The effective penetration or depth of the electrostatic field is directly proportional to the width dimension $g$ of the gap, and inversely proportional to the width dimension $w$ of the electrode plate, while the sensitivity or amount of power absorbed or effect produced is proportional to the length of electrode gap 17, as previously stated. Obviously, dimensions $w$ and $g$ may be taken at different values to adjust the depth or penetration of the field to suit various requirements. In the given case, plate width $w$ is two-thirds of the width of gap $g$, giving an electrode unit of comparatively high sensitivity.

Figures 2A, 4:
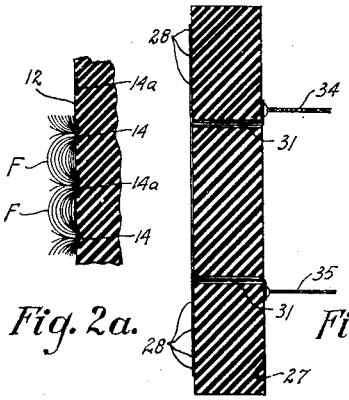
Fig. 2a is an enlarged detail taken from Fig. 2.
Fig. 4 is a cross section of the device taken on line 4—4 of Fig. 3.
Figure 3:
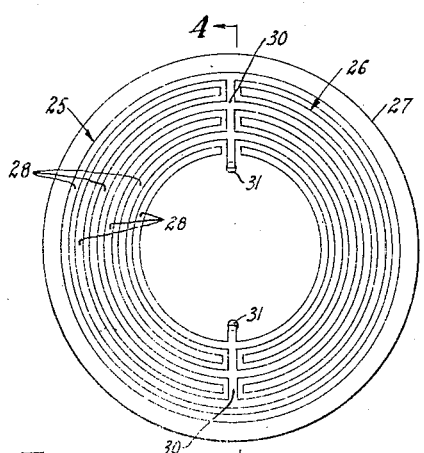
Fig. 3 is a face view of a variational, preferred form of electrode sets, in which the electrode plate elements are slightly wider than the gap width between plate elements.

Figs. 3 and 4 show a variational and preferred form of the electrode unit. In this instance the electrode plate elements 25 and 26 are applied to the plane upper face of an insulation block 27, which is preferably in the form of a disc. As will be evident from Fig. 3, each of the electrode elements is divided into a plurality of concentric, radially spaced ring members 28 of constant equal widths and equal radial spacings, the ring members of one element interfitting with or lying between the ring members of the other element. The ring members of each electrode element are broken along a radial line, as indicated, the breaks in the two sets of rings being 180° apart. Each set of rings is connected by a radial member 30, also preferably of constant width, and substantially equal in width to ring members 28, the radial member 30 connecting the ring members 28 of each electrode element running along the described break in the ring members of the other electrode element, being spaced from the ends of said ring members by a distance substantially equal to, or greater than, the distance between adjacent ring members of the two electrode elements.

Radial members 30 extend inwardly within the inner ring member 28, and then rearwardly to the rear face of the disc through drill holes 31, their terminals being fastened to the rearward side of the disc in any suitable manner, as by cementing. Suitable electrical connections are made to these terminal portions in any desired manner; for example, leads 34 and 35 may be soldered directly to the fastened terminals, as indicated in Fig. 4.

The ring members 28 of the device of Figs. 3 and 4 are illustrated as having a width dimension of $\frac{1}{16}$″, while the spacing between adjacent rings is $\frac{3}{64}$″, or just slightly less. The thickness of the electrode elements 25 and 26 may vary within certain limits, though elements of foil-like thinness, that is, from one to several thousandths of an inch in thickness, are preferable for many applications. The electrode unit of Figs. 3 and 4 as thus described has an exceptionally long gap, and is of high sensitivity, while the plates are of such thinness that the effects of "edge capacity" are minimized.

Attention is directed to the fact that the forms of Figs. 1 and 3 both involve branched and interfitted electrode elements, the form of Fig. 1 being characterized by straight, parallel lines, and the form of Fig. 3 being characterized by concentric rings.

Figure 5:
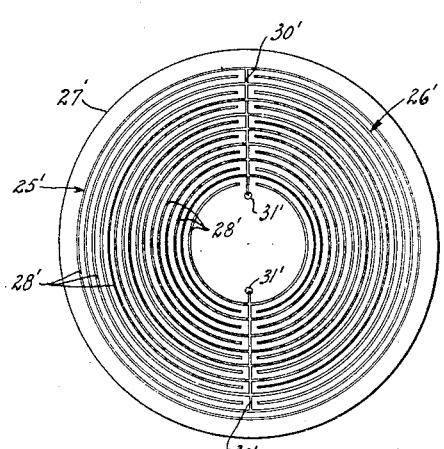
Fig. 5 is a face view of an electrode unit of the type shown in Fig. 3, but showing the electrode plates in somewhat different proportions, with the width of the electrode plate elements less than the gap width between plate elements.

Fig. 5 shows an electrode unit of the type of Fig. 3, but of modified dimensions, members of the unit of Fig. 5 being identified by the same reference numerals as are applied to Fig. 3, but with primes annexed. In the unit of Fig. 5 the width of ring members 28′ is somewhat reduced as compared to the width of the gap between adjacent ring members, in order to provide an increased averaging effect in the response of connected indicating apparatus when the electrode is used on material of non-uniform or spotty characteristics with regard to the property under measurement, such as the moisture content of paper pulp. The effect of decreasing the width dimension of the electrode plates is to limit the amount of power absorption of any small area or small portion of the electrode field and to prevent peak readings of the associated indicating apparatus on material of non-uniform characteristics. The device of Fig. 5 is shown as provided with ring members of a width of 1/64", spaced 1/32" apart, while the thickness of said members is typically from .001" to .002".

The forms of invention shown in Figs. 1 to 5 all involve branched electrode members comprising relatively narrow interfitted and uniformly spaced members adapted to cover substantial areas of the material on test. All these forms of the invention have to a greater or less degree, dependent on the dimensional relations described above, the significant advantage that the amount of power absorbed by spots in the material of high power absorbing qualities is relatively small as compared with the total power drawn from the electrode set by the balance of the material under test, so that the tendency to give a peak response when a small spot of high power absorbing characteristics is encountered is minimized. Likewise, the effect on the response caused by small areas of less than average power absorbing characteristics is minimized. The response or effect on the connected apparatus thus becomes closely proportional to the average power absorbing characteristic of the material rather than rising to peak values under the influence of relatively small local areas of high power absorbing characteristics or being sharply depressed by small local areas of low power absorbing characteristics.

Figures 6, 7:
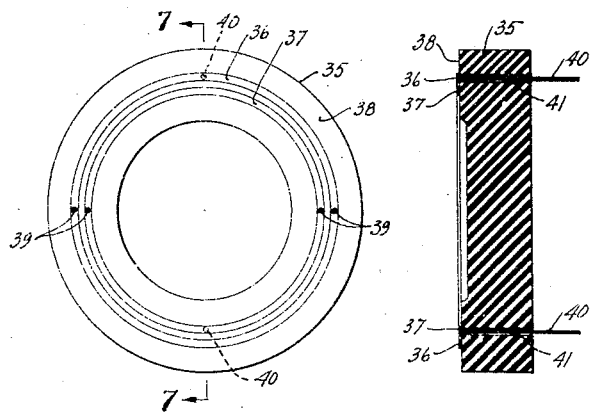
Fig. 6 is a face view of a simplified form of electrode unit in accordance with the invention.
Fig. 7 is a cross section of the electrode set taken on line 7—7 of Fig. 6.

Figs. 6 and 7 show a simplified unit in accordance with the invention suitable for certain applications. In this instance, the base of the unit is again an insulation disc, designated at 35, while the electrode elements comprise a pair of concentric, radially spaced flat rings 36 and 37 secured to the front face 38 of an insulation disc 35 as by small screws 39. Rings 36 and 37 are indicated as of a thickness dimension of 1/64", though this illustration is not to be taken as limitative, since the thickness of the members may be varied as circumstances require. However, as previously indicated, it is in general desirable to keep the thickness dimension of the rings relatively small in order to keep the capacity between the edges of the members at a comparatively low value and thus cause the greater part of the electrostatic field to arch between the flat surfaces of the rings. Rings 36 and 37 are both preferably relatively narrow and of a width dimension of the order of the width of the gap between the rings. In the present illustrative embodiment, rings 36 and 37 are each 1/16" in width and are spaced apart 1/32". This results in the production of an electrode with an effective field depth, a suitable sensitivity, and a mechanical ruggedness adapted for commercial use on power absorption moisture measuring apparatus for thin wood veneers between 1/32" and 1/16" in thickness.

Each of rings 36 and 37 has soldered to its underside a lead 40 extending rearwardly through a drill hole 41 in insulation base 35, as indicated in Fig. 7.

Figs. 8 and 9 show an electrode unit provided with a cover plate or layer of insulation material over the electrode plates. In the specific illustrative form of Figs. 8 and 9, the flat, co-planar electrode elements 40 and 41, which are of the general form shown in Fig. 1, are embedded within a molded insulation block 42, the outer plane of the electrode members being spaced a short distance $l$ from the front 42a of the insulation block. That portion of the insulation block lying between electrode element and the surface 42a accordingly constitutes the cover member or spacing layer or means which lies between the electrode elements and the material to be tested.

Figs. 10 and 11 show a variational form, in which the electrode elements 45 and 46 are sunk in the front face 47 of insulation block 48, the outer surfaces being flush with surface 48, and a separate removable cover plate 49, also of insulation material, is applied to surface 47. For instance, insulation block 48 may be provided at its corners with projecting pins 50 which engage drill holes 51 in the corners of the insulation cover plate. These pins are preferably tightly set in block 48, while cover plate 49 may be removably mounted on the pin, so that it can be interchanged with other cover plates of different thicknesses, in order to vary the response characteristics of the unit, or to vary the range of the device, as more fully explained below.

It will be evident that the described covering layer or plate placed over the electrode elements protects them against injury, which is a feature of extreme importance when elements of foil-like thinness are employed.

In instances wherein protection for the electrode elements or plates is not a factor, yet in which it is desirable to space the electrode elements from the material to be tested for other reasons, as for the purpose of changing the response characteristic, spacing devices other than full cover plates may of course be employed. For instance, pins 50 placed in the corners of insulation block 48 may be utilized, without cover plate 49, to space electrode elements 45 and 46 from the surface of the material to be tested. In such an instance, the forward ends of said pins will engage the surface of the material, and the spacing distance will of course be the length of the projecting portions of the pins.

Fig. 12 shows a typical response characteristic curve for an electrode unit of the type of the present invention, connected to a moisture register system, for instance of the type disclosed in our aforesaid copending application, Ser. No. 125,110, as applied to moisture testing of wood. The characteristic curve designated A represents the relation between the indicated response and the percentage moisture in the sample on test. It will be noted that all indications from one to five per cent of moisture occur in about two-fifteenths of the total range covered, whereas readings from five to ten per cent occur in about seven-fifteenths of the total scale range. Such a condition may be highly desirable in some applications, though in other applications a more nearly linear response curve may be desired, and this is more nearly approximated with use of an electrode unit of the type in which the electrodes are spaced a short distance from the material, as by use of a cover plate of sensible thickness, or of spacing means such as pins 50 in the form of Figs. 10 and 11. The curve designated C in Fig.

12 represents the more linear response characteristic resulting from use of an electrode unit of the type in which the electrode elements are spaced a short distance from the material during the test.

The use of a cover plate or other spacing means over the electrode element of course results in a decrease in the amount of power absorbed by the sample of material on test, which is due to the material being moved out of the more concentrated regions of the electrostatic field. The decrease in power absorbed is proportionately greater for samples of higher power absorbing characteristics than for those of low power absorbing characteristics, which of course results in the above noted change in the characteristic response curve of the system. Thus by this means the shape of the response curve may be varied within certain limits to suit the requirements of the application at hand.

Figs. 13 and 14 show an electrode designed for measurement of the relative humidity of the atmosphere or of a gas under test. The electrode elements are indicated at 60 and 61, being illustratively of the type shown in Figs. 1 and 2, these electrode elements being mounted again on an insulation block 62. As appears in Fig. 14, the outer faces of the electrode elements are again flush with the forward face 63 of the insulation block. The forward face of the unit is covered with a coating 64 of a hygroscopic substance, which readily absorbs moisture from the atmosphere, and whose moisture content maintains a known relation to the relative humidity of the atmosphere. This coating 64 may consist of any one of various cellulose compounds dissolved by a suitable solvent and coated on the surface of the electrode unit. For instance, cellulose acetate may be dissolved in acetone, forming a lacquer which may be applied as a thin coating 64 to the front face 63 of the unit. The moisture content or layer 64 varies with the relative humidity of the atmosphere, and the power absorbed by this coating or layer from the electrostatic field of the electrode element varies directly with the absorbed moisture content. Accordingly, a suitable moisture register system connected to the terminals of electrode plates 60 and 61 and designed to register in accordance with power absorbed from the field of the electrode elements, will give an indication which may be calibrated directly in terms of relative humidity.

The electrode units herein illustrated and described are but illustrative of various forms and proportions typical of the present invention, which is not to be considered as limited in its broad scope to the specific forms shown; and the broad invention as well as the appended claims are therefore to be considered as contemplating electrode units involving all equivalent modifications in design, dimensions, construction and arrangement.

We claim:

1. A high frequency test device for testing qualities of dielectric materials, comprising a support, and a pair of coplanar, multiply-branched and interfitted electrode elements mounted at uniform spacing and electrically insulated from one another on said support, said elements each comprising a plurality of radially spaced concentric rings, the rings of one electrode element being disposed in the spaces between rings of the other electrode element, and there being a series of uniform width gaps between the adjacent rings of the two electrode elements, the electrode elements being at no place more closely spaced than the width of said gaps.

2. A high frequency test device for testing qualities of dielectric materials, comprising a support, and a pair of coplanar, multiply-branched and interfitted electrode elements mounted at uniform spacing and electrically insulated from one another on said support, said elements each comprising a plurality of radially spaced concentric rings, the rings of one electrode element being disposed in the spaces between rings in the other electrode element, and there being a series of uniform width gaps between the adjacent rings of the two electrode elements, the rings of each electrode element being interrupted along a radial line, and each electrode element having a radially extending connecting strip lying along the radial line of interruption of the rings of the other electrode element, the electrode elements being at no place more closely spaced than the width of said gaps.

3. A high frequency electrostatic device for testing qualities of dielectric materials, comprising a support, and a pair of coplanar electrode plates of substantially ring-like formation and having substantially equal, uniform widths mounted at uniform spacing and electrically insulated from one another on said support, said electrode plates being adapted to be positioned by said support adjacent the surface of a material to be tested, said electrode plates having opposed edge portions defining a high frequency gap of substantially uniform width, and being at no place more closely spaced than the width of said gap, such that a high frequency electrostatic field extends across said gap between said edge portions and forwardly of said electrode plates to penetrate a material to be tested when said plates are connected to a source of high frequency current.

4. A high frequency electrostatic device for testing qualities of dielectric materials, comprising a support, and a pair of coplanar, multiply-branched interfitted electrode plates mounted on and electrically insulated from one another on said support, the widths of each of the branches of said electrode plates being uniform along the lengths thereof, said electrode plates being adapted to be positioned by said support adjacent the surface of a material to be tested, and the branches of said pair of electrode plates having opposed edges defining a high frequency gap of substantially uniform width, and of a width dimension of the same order as the width dimensions of said electrode plate branches, and being at no place more closely spaced than the width of said gap, such that a high frequency electrostatic field extends across said gap between said edge portions and forwardly of said electrode plates to penetrate a material to be tested when said plates are connected to a source of high frequency current.

5. A high frequency electrostatic device for testing qualities of dielectric materials, comprising a support, and a pair of coplanar, multiply-branched interfitted electrode plates of foil-like thinness mounted on and electrically insulated from one another on said support, the widths of each of the branches of said electrode plates being uniform along the lengths thereof, said electrode plates being adapted to be positioned by said support adjacent the surface of a material to be tested, and the branches of said pair of electrode plates having opposed edges defining a high frequency gap of substantially uniform width, and of a width dimension of the same order as the width dimensions of said electrode plate branches, and being at no place more closely spaced than the width of said gap, such that a high frequency electrostatic field extends across said gap between said edge portions and forwardly of said electrode plates to penetrate a material to be tested when said plates are connected to a source of high frequency current.

ROBERT L. STEVENS.
JAMES P. DALLAS.